US008466887B2

(12) United States Patent  
Lin et al.

(10) Patent No.: US 8,466,887 B2
(45) Date of Patent: Jun. 18, 2013

(54) METHOD AND SYSTEM FOR HANDLING MULTIPLE TOUCH INPUT ON A COMPUTING DEVICE (75) Inventors: Jen-Chiun Lin, Taoyuan (TW); Tsung-Hwa Yang, Taoyuan (TW); Chih-Sheng Wei, Taoyuan (TW)

(73) Assignee: HTC Corporation, Taoyuan City (TW)

( * ) Notice: Subject to any disclaimer, the term of this patent is extended or adjusted under 35 U.S.C. 154(b) by 734 days.

(21) Appl. No.: 12/634,622

(22) Filed: Dec. 9, 2009

(65) Prior Publication Data

US 2011/0134049 A1    Jun. 9, 2011

(51) Int. Cl.
*G06F 3/041* (2006.01)

(52) U.S. Cl.
USPC .......................................................... 345/173

(58) Field of Classification Search
None
See application file for complete search history.

(56) References Cited

U.S. PATENT DOCUMENTS 5,596,346 A * 1/1997 Leone et al. ................. 345/667
2004/0243629 A1* 12/2004 Nomura et al. ............ 707/104.1
2006/0026536 A1* 2/2006 Hotelling et al. ............. 715/863
2007/0101291 A1 5/2007 Forstall et al.
2007/0247435 A1 10/2007 Benko et al.
2009/0210810 A1* 8/2009 Ryu et al. ..................... 715/769
2009/0237363 A1 9/2009 Levy et al.

FOREIGN PATENT DOCUMENTS

EP        1942401 A1      7/2008

\* cited by examiner

*Primary Examiner* — Joseph Haley
*Assistant Examiner* — Nicholas Lee
(74) *Attorney, Agent, or Firm* — Perkins Coie LLP (57) ABSTRACT

A system for handling multi-touch input on a computing device enables the device to handle multi-touch input where each touch input is provided to a separate application executing on the device. In response to a first touch input, a first application generates and registers a first connection point with a link component. Similarly, a second application generates and registers a second connection point in response to a second touch input. The link component then provides the second connection point to the first application and notifies the first application that it should complete a communication connection with the second application. The two applications then exchange information to determine a coordinator application that will execute first in response to the input. The information exchange may include a handshake process in which each application may request or provide information and notify the other application that it will or will not execute an operation. After the coordinator is selected, the selected application executes an operation.

14 Claims, 8 Drawing Sheets

METHOD AND SYSTEM FOR HANDLING MULTIPLE TOUCH INPUT ON A COMPUTING DEVICE

BACKGROUND

In general, computing devices with graphical user interfaces (GUIs), such as computers and mobile devices, are designed to receive user input using input devices such as a mouse, keyboard, or a number pad. Some computing devices (particularly mobile devices) also include a touch-sensitive screen. Until recently, touch-sensitive screens were generally "single-touch" screens, which process a single touch input at a time. Thus, computing devices with these screens were generally configured to use the touch-sensitive screen to provide a pointer input as an alternative to a mouse. More recently, "multi-touch" touch-sensitive screens have been produced that are capable of receiving multiple touch input simultaneously. For example, iPhones sold by Apple, Inc. of Cupertino, Calif., enable users to use a thumb and forefinger in combination to control the level of zoom in various mobile applications. However, even modern computing devices do not make extensive use of the multi-touch capabilities of these new devices. Thus, it would be useful to have new means for controlling computing devices based on multi-touch user input.

DETAILED DESCRIPTION

A system for handling multi-touch input on a computing device, such as a mobile device, is disclosed (hereinafter referred to as the "multi-touch input system" or the "system"). In particular, the system enables the device to handle multi-touch input where each touch input is provided to a separate application executing on the device. When a first touch input is received by the mobile device, the operating system uses the location of the touch input to determine which application should receive the input information. The first application then determines if the touch input selected a user interface object, such as an icon, button, or menu item, that supports linking (i.e., can interact with a second application). If the object supports linking, the first application generates a connection point (i.e., an object that provides a communication point to an application) and registers the connection point with a link component, which is generally provided by the operating system (OS) of the device. After the first application's connection point is registered, the system waits to receive a second touch input. If a second touch input selecting a second application is received while the first touch input is still active (e.g., before the user releases the touch), the system handles the multi-touch input by creating a communication link between the two applications. In particular, when the second touch input is received, the second application repeats the steps described above to register a second connection point with the link component.

After the link component receives the registration information for the second application, it provides the second connection point to the first application and notifies the first application to complete a communication connection with the second application. The first application completes the connection by providing its connection point to the second application using the second application's connection point. The two applications then exchange information to identify which application will execute first in response to the input (referred to as the "coordinator"). The coordinator is selected based on the communication between the applications and is not necessarily based on the order in which the applications are selected. The information exchange may include a handshake process in which each application may request or provide information. The applications may also notify each other that they will or will not execute an operation in response to the touch input. After the coordinator is identified, the identified application executes an operation. The connection is released after both applications indicate that they have completed processing.

In one embodiment, the first application is a toolbox application containing various functions that can be executed in association with a second application, such as a search function. The second application may be, for example, a map application configured to provide location information to the first application. In this embodiment, the map application is configured to provide location information to another application without performing any processing of its own. Thus, in response to the multi-touch input, the map application provides a map location to the toolbox application, which executes a selected function based on the map location.

Figure 1:
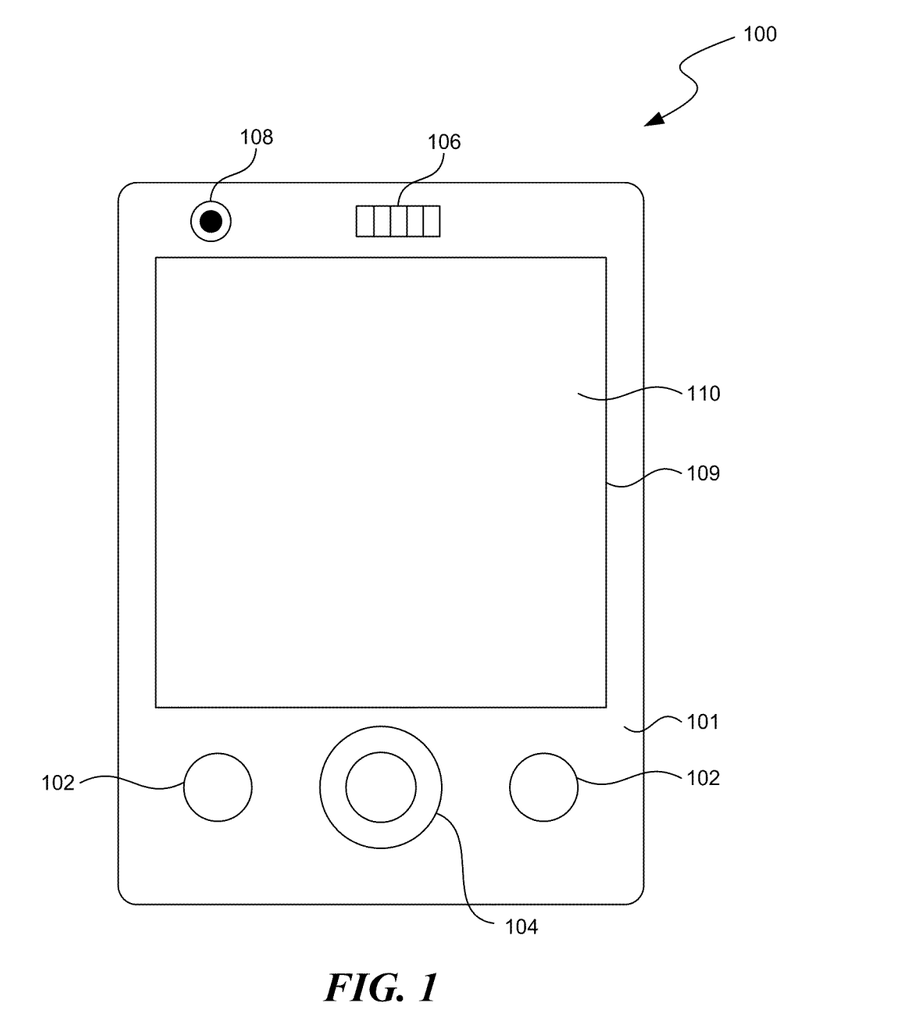
FIG. 1 is a front view of a mobile device suitable for implementing a multi-touch input system.

FIG. 1 is a front view of a mobile device 100 suitable for implementing a multi-touch input system. As shown in FIG. 1, the mobile device 100 can include a housing 101, a plurality of push buttons 102, a directional keypad 104 (e.g., a five-way key), a speaker 106, a camera 108, and a display 110 carried by the housing 101. The mobile device 100 can also include microphones, transceivers, photo sensors, and/or other computing components generally found in PDA devices, cellular phones, laptop computers, tablet PCs, smart phones, handheld e-mail devices, or other mobile communication/computing devices.

The display 110 can include a liquid-crystal display (LCD), a plasma display, a vacuum fluorescent display, a light-emitting diode (LED) display, a field emission display, and/or other suitable types of display configured to present a user interface. The mobile device 100 also includes a touch sensing component 109 configured to receive input from a user. For example, the touch sensing component 109 can include a resistive, capacitive, infrared, surface acoustic wave (SAW), and/or other types of touch screen. The touch sensing component 109 can be integrated with the display 110 or can be independent from the display 110. In the illustrated embodiment, the touch sensing component 109 and the display 110 have generally similarly sized access areas. In other embodiments, the touch sensing component 109 and the display 110 can have differently sized access areas. For example, the touch sensing component 109 can have an access area that extends beyond the boundaries of the display 110.

The mobile device 100 can also include a camera 108 suitable for taking pictures or recording video. The camera 108 includes an optical image sensor and a lens and may also have a flash associated with it for taking pictures in low-light conditions. Although the camera 108 is shown on the front face of the mobile device 100, the camera 108 could also be located on the rear face of the device. Alternatively, the mobile device 100 might be configured with multiple cameras, such as with a first camera on the front face and a second camera on the back face.

Figure 2:
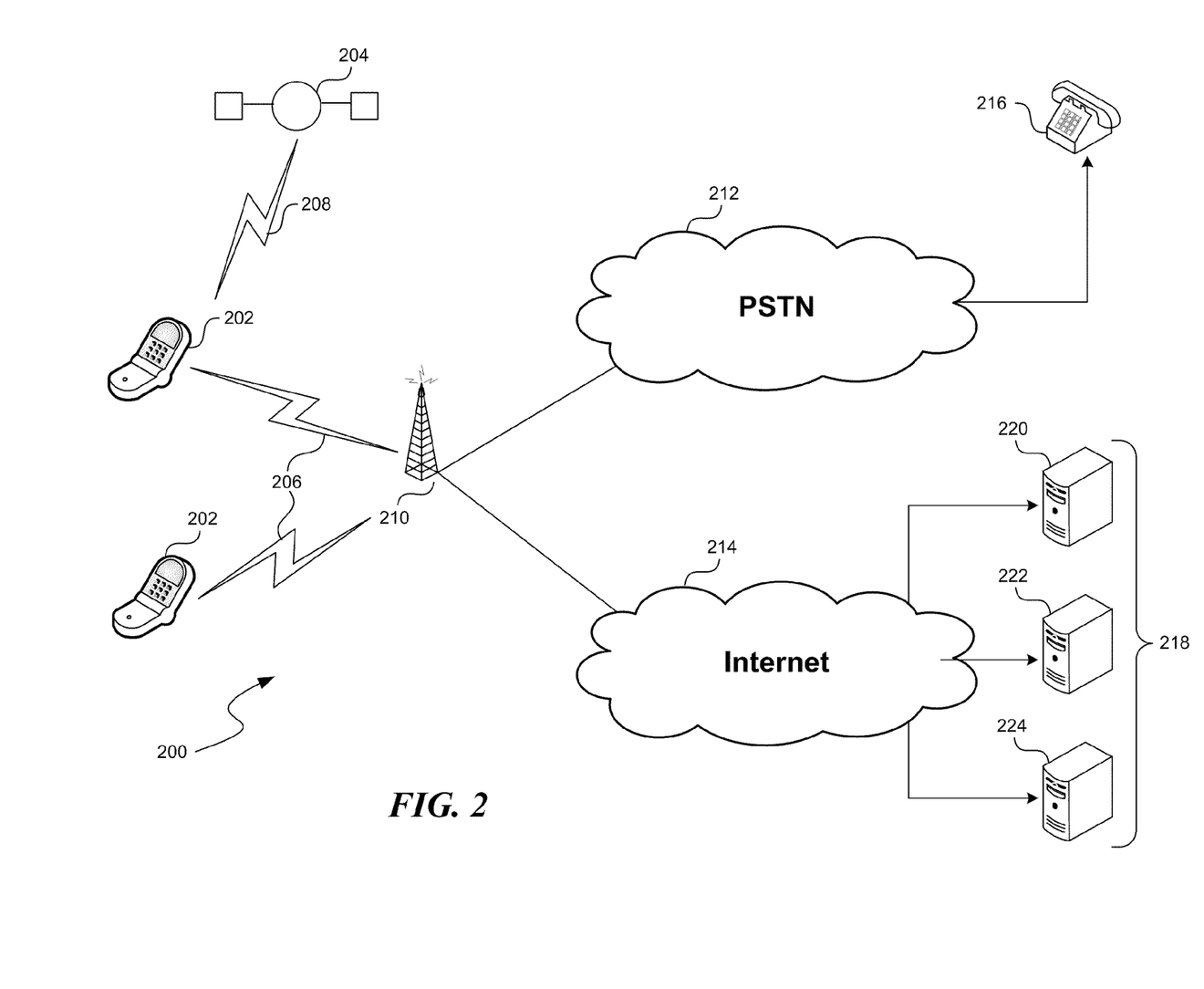
FIG. 2 is a network diagram of a representative environment in which the multi-touch input system operates.

FIG. 2 is a network diagram of a representative environment 200 in which the multi-touch input system operates. A plurality of mobile devices 202 roam in an area covered by a wireless network. The mobile devices are, for example, cellular phones or mobile Internet devices, such as the mobile device 100 shown in FIG. 1. The mobile devices 202 communicate to a cellular transceiver 210 through a wireless connection 206. The wireless connection 206 could be implemented using any system for transmitting digital data. For example, the connection could use a cellular network implementing UMTS or CDMA2000 or a non-cellular network implementing WiFi (IEEE 802.11) or Bluetooth. Although wireless connections are most common for these mobile devices, the devices may also communicate using a wired connection such as Ethernet.

In some configurations, the mobile devices 202 also have a Global Positioning System (GPS) receiver embedded in them to provide location information. In these configurations, the mobile devices 202 also receive a location signal 208 from one or more GPS satellites 204. For clarity, the figure only shows one satellite. However, a GPS receiver generally requires several satellites in order to determine its location. Alternatively or additionally, the cellular transceiver 210 may, with assistance from the mobile devices 202, employ known signal triangulation and/or signal delay techniques to determine the location of each wireless device.

The cellular transceiver 210 is connected to one or more networks that provide backhaul service for the wireless network. The cellular transceiver 210 is connected to a Public-Switched Telephone Network ("PSTN") 212, which provides a connection between the mobile network and a remote telephone 216 on another network. When a user of one of the mobile devices 202 makes a voice telephone call, the cellular transceiver 210 routes the call through the wireless network's voice backhaul (not shown) to the PSTN 212. The PSTN 212 then automatically connects the call to the remote telephone 216. If the remote telephone 216 is another mobile device, the call is routed through a second wireless network's backhaul to another cellular transceiver.

The cellular transceiver 210 is also connected to the Internet 214, which provides a packet-based connection to remote devices 218 supporting network applications. When the user of one of the mobile devices 202 communicates through a data connection, the cellular transceiver routes the packet data through the wireless network's data backhaul (not shown) to the Internet 214 (or another packet-based network). The Internet connects the wireless network to remote devices 218, including an e-mail server 220, a web server 222, and an instant messenger server 224. Of course, the remote devices 218 could include any application available over the Internet 214, such as a file transfer protocol (FTP) server or a streaming media server.

Figure 3:
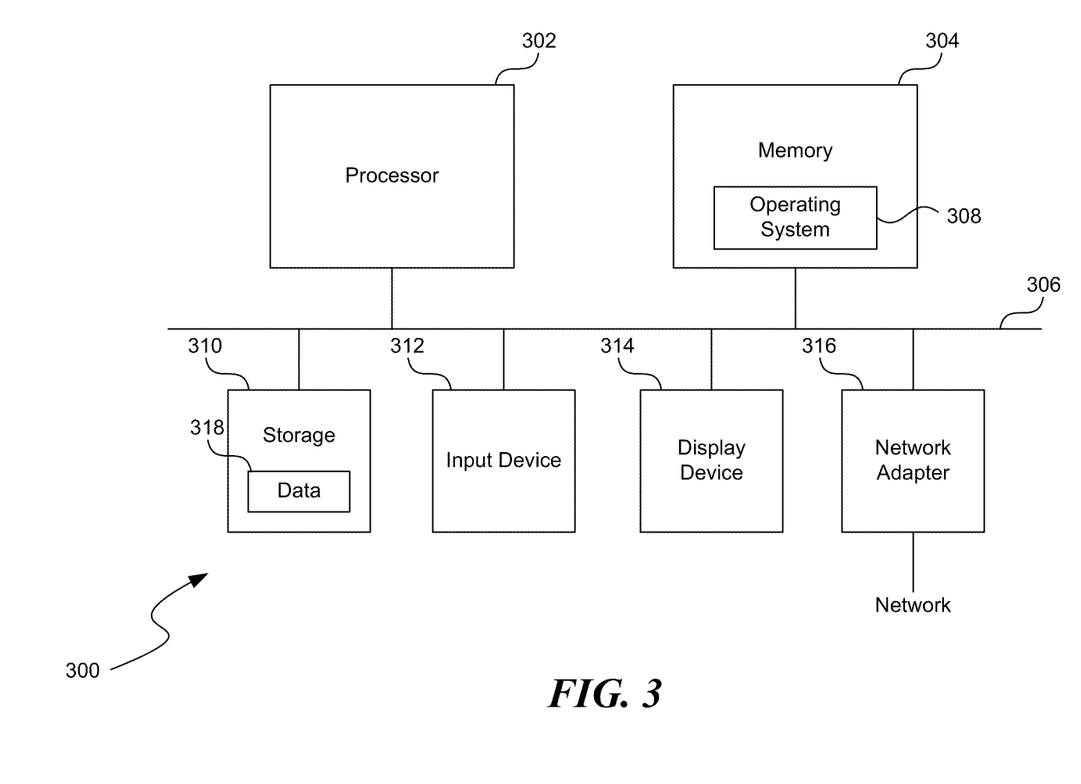
FIG. 3 is a high-level block diagram showing an example of the architecture of a mobile device.

FIG. 3 is a high-level block diagram showing an example of the architecture of a mobile device 300. The mobile device 300 may represent the mobile devices 202 of FIG. 2. The mobile device 300 includes one or more processors 302 and memory 304 coupled to an interconnect 306. The interconnect 306 shown in FIG. 3 is an abstraction that represents any one or more separate physical buses, point-to-point connections, or both connected by appropriate bridges, adapters, or controllers. The interconnect 306, therefore, may include, for example, a system bus, a Peripheral Component Interconnect (PCI) family bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire."

The processor(s) 302 may include central processing units (CPUs) of the mobile device 300 and, thus, control the overall operation of the mobile device 300. In certain embodiments, the processor(s) 302 accomplish this by executing software or firmware stored in memory 304. The processor(s) 302 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 304 is, or includes, the main memory of the mobile device 300. The memory 304 represents any form of fixed or removable random access memory (RAM), read-only memory (ROM), flash memory, or the like, or a combination of such devices. In use, the memory 304 stores, among other things, the operating system 308 of the mobile device 300.

The mobile device 300 includes an input device 312, which enables a user to control the device. The input device 312 may include a keyboard, trackpad, touch sensitive screen (e.g., the touch sensing component 109 of FIG. 1), or other standard computer input device. The mobile device 300 also includes a display device 314 suitable for displaying a user interface, such as the display 110 (FIG. 1). The mobile device 300 further includes a network adapter 316 that provides the mobile device 300 with the ability to communicate with remote devices over a network and may be, for example, a wireless adapter. The mobile device 300 may further include local storage 310 coupled to the interconnect 306. The local storage 310 may include, for example, a flash memory device configured to provide mass storage and stores data 318 used by the mobile device.

Figure 4:
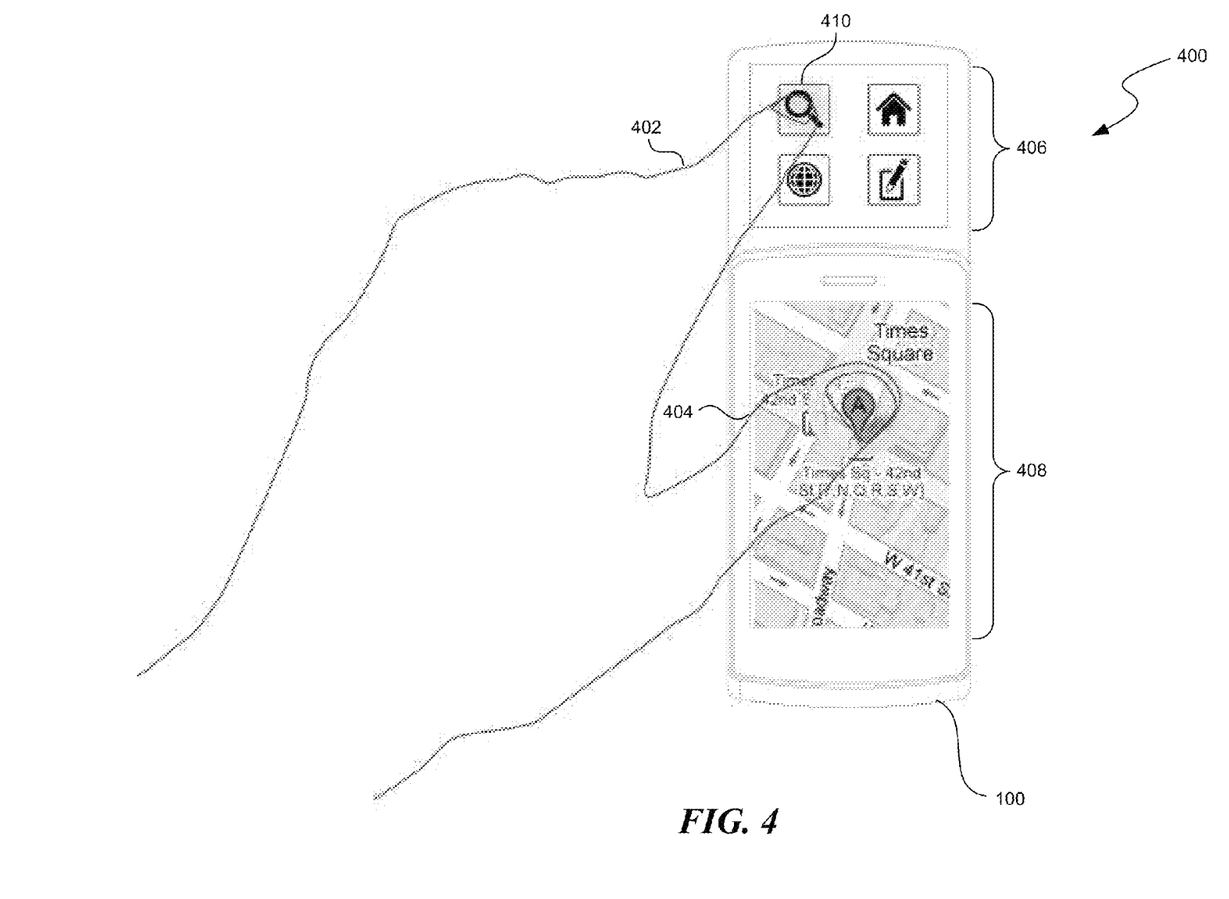
FIG. 4 shows a representative interface suitable for use with the multi-touch input system.

FIG. 4 shows a representative interface 400 suitable for use with the multi-touch input system. The interface is provided by a computing device, such as the mobile device 100. As shown in FIG. 4, a user provides input to the mobile device 100 using a forefinger 402 and a thumb 404, which are touching locations on the touch screen that correspond to different applications. The interface 400 includes a toolbox application 406, which provides a basic set of functions that are suitable for use with multiple applications. In particular, the toolbox application 406 includes a search button 410, which is selected by the user's forefinger 402. The interface 400 also includes a map application 408. The map application 408 displays a particular location based on an address provided to the application. As shown in the figure, the user is selecting a particular point on the display corresponding to a location on a map of New York City.

To use the interface 400, the user simultaneously selects an icon from the toolbox application, such as the search button 410, and a location in the map application 408. The mobile device 100 then manages communication between the two applications to execute the particular function depending on the selected icon and location. In the case shown in FIG. 4, the mobile device 100 processes the input by executing a search based on the selected location. The search may be, for example, an Internet search using a default search provider configured by the mobile device 100. For purposes of handling the input, the order in which the user selects the toolbox application 406 and the map application 408 does not affect the processing that is executed in response. Rather, as discussed in detail below, once the user ends the touch input the applications automatically determine what processing to execute. One skilled in the art will appreciate that the interface 400 could provide other function combinations that could be generated by communicating between separate applications.

Figure 5:
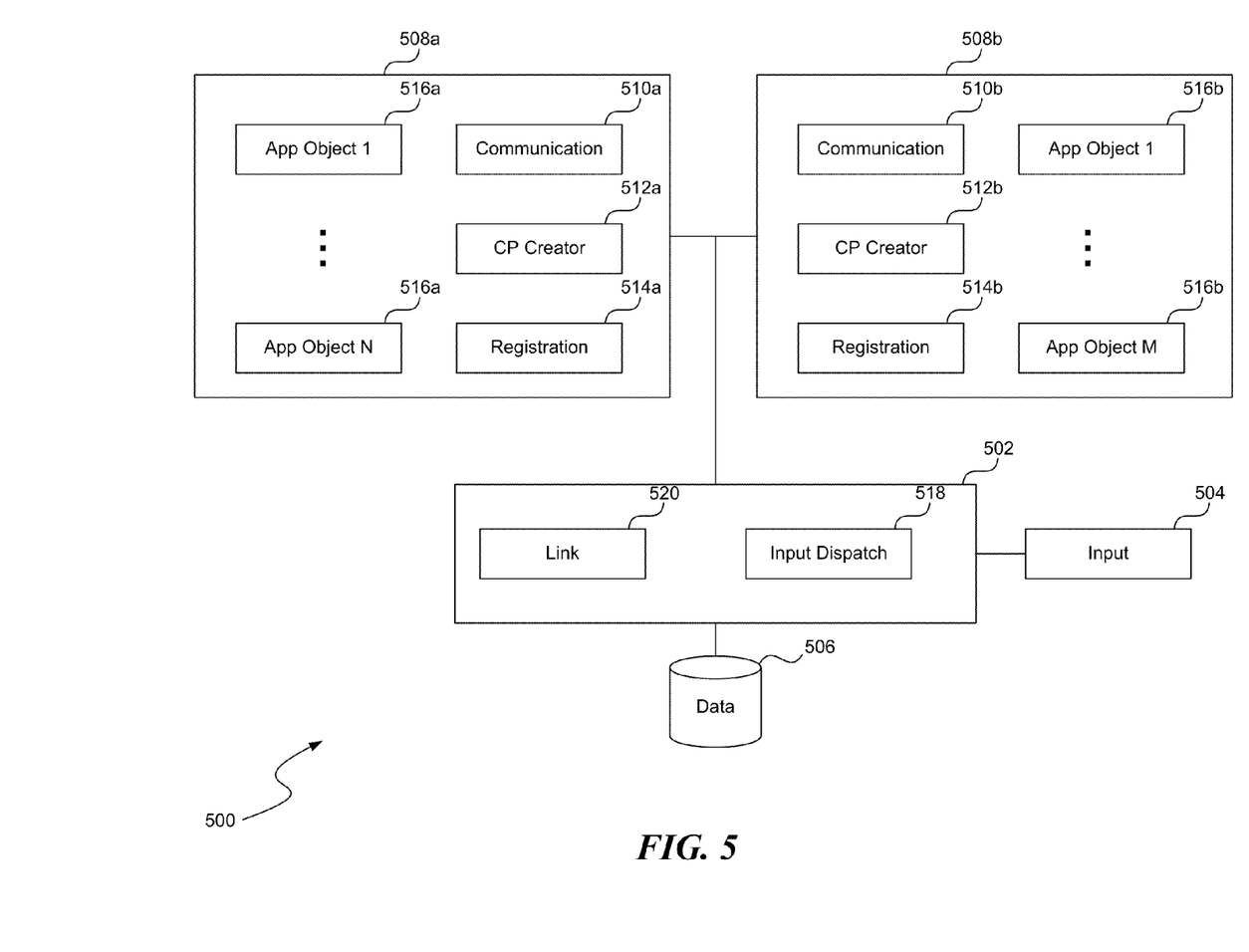
FIG. 5 is a logical block diagram of the multi-touch input system.

FIG. 5 illustrates a logical block diagram of a multi-touch input system 500. The system 500 may be implemented by a computing device such as the mobile device 100 (FIG. 1). Aspects of the system may be implemented as special purpose hardware circuitry, programmable circuitry, or a combination of these. As will be discussed in additional detail herein, the system 500 includes a number of modules to facilitate the functions of the system. The modules and their underlying code and/or data may be implemented in a single physical device or distributed over multiple physical devices and the functionality implemented by calls to remote services. Similarly, data could be stored in local storage or remote storage, and distributed in one or more physical devices. Assuming a programmable implementation, the code to support the functionality of this system may be stored on a computer-readable medium such as an optical drive, flash memory, or a hard drive. One skilled in the art will appreciate that at least some of these individual modules may be implemented using application specific integrated circuits (ASICs), programmable logic devices (PLDs), or a general-purpose processor configured with software and/or firmware.

As shown in FIG. 5, the system 500 includes a system component 502, which is configured to manage interactions between one or more applications on the mobile device 100. The system component 502 may be implemented, for example, by a portion of an operating system executed by a processor in the mobile device 100. The system component 502 receives input from an input component 504, which is configured to receive user input. The input component 504 may be implemented using a multi-touch capable touch-sensitive screen. When user input is received from a touch-sensitive screen, the input may include location information indicating a position on the screen that was selected by the user. The system component 502 also interacts with a data storage component 506, which is configured to store settings information associated with the operation of the system 500. The data storage component 506 may also be used to provide data storage for one or more applications, such as a first application 508a and a second application 508b. The first application 508a and the second application 508b may correspond to the toolbox application 406 and the map application 408 of FIG. 4, but may also correspond to other applications capable of communicating to execute operations in response to multi-touch user input. As noted above, the system handles multi-touch input identically regardless of which application receives the initial input. Thus, "first" and "second" are used to indicate an order that the applications receive user input but do not indicate that one application has a higher priority for execution than the other.

The applications 508a and 508b are configured to execute in separate processes of the operating system of the mobile device 100. During operation, the applications 508a and 508b communicate with the system component 502 to establish communications and handle multi-touch inputs. The first application 508a includes a first communication component 510a, which is configured to communicate with other processes in the system 500. In particular, the first communication component 510a communicates with the system component 502 to receive user input information and to initiate communication with the second application 508b in response to a multi-touch input. This process is discussed in greater detail below with reference to FIG. 6.

The first application 508a also includes a first connection point creator component 512a, which is configured to create a connection point object in response to a user input. As used herein, a "connection point" is an object that can be used as a conduit through which communications between applications are sent. The first application 508a also includes a first registration component 514a, which registers newly created connection points with the system component 502. The first application 508a also includes various application objects 516a, which execute the processing of the application during normal operation. The application objects 516a support aspects of the user interface or execute internal processes. In the multi-touch input system, these application objects 516a are aware of whether they support multi-touch linking as described herein. As shown in FIG. 5, the second application 508b includes components having similar functionality to the components of the first application 508a, including a second communication component 510b, a second connection point creator component 512b, and a second registration component 514b. The second application 508b also includes application objects 516b, which execute the processing of the second application 508b.

As discussed above, the system 500 includes a system component 502, which handles low-level functions, such as receiving input, and enables communication between the first application 508a and the second application 508b. The system component 502 includes an input dispatch component 518, which is configured to receive input information from the input component 504 and dispatch the input information to a handler, such as one of the applications 508a and 508b. The input information may include, for example, receiving a "touch down" input from the input component 504, which indicates that the user has pressed a finger or pointing device down on the touch-sensitive input component. The input information may also include a "touch up" input, in which the input component 504 indicates to the system component 502 that the user has released the touch previously initiated by the touch down input. In each case, the input dispatch component 518 determines which application corresponds to the location of the input received from the input component 504. In general, the input dispatch component 518 can determine the corresponding application by comparing the location of the received input to the area of the screen occupied by each application. The input dispatch component 518 then forwards the input information to the corresponding application. The communication component 510a or 510b of the corresponding application then acts on the input information, as discussed below.

The system component 502 also includes a link component 520, which is configured to manage the interactions between the first application 508a and the second application 508b. In particular, when the first application 508a determines that it has received an input that can be linked to a multi-touch input, the first connection point creator component 512a creates a connection point to be used for communication between the applications. The first registration component 514a then registers the newly created connection point with the system component 502 by providing the connection point information and information identifying the application to the link component 520. The first registration component 514a may also provide information identifying a particular application object that was selected by the user input. Similar processing is executed by the second application 508*b* in response to a second multi-touch input. The link component 520 then completes the connection by notifying the first application 508*a* in response to the second application's registration.

Figure 6:
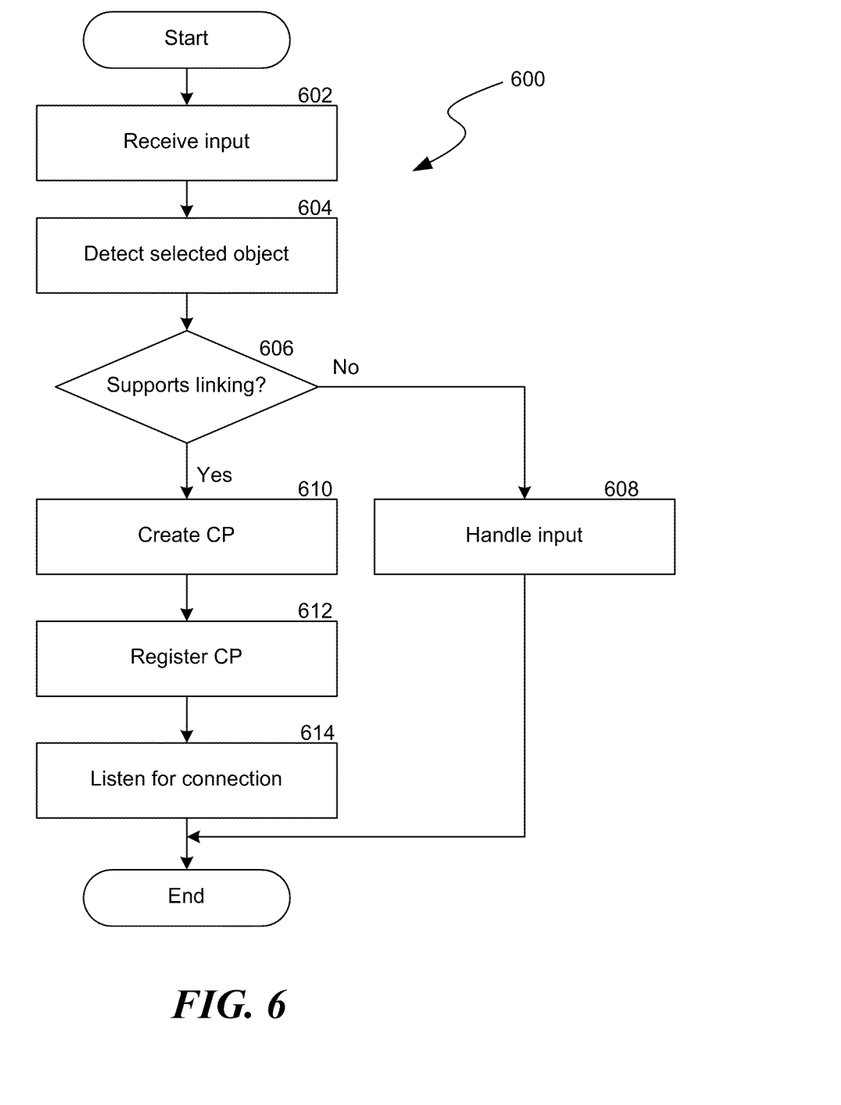
FIG. 6 is a flowchart of a process implemented by an application for processing user input and registering to link with another application.

FIG. 6 is a flowchart of a process 600 implemented by an application 508 for processing user input and registering to link with another application. Similar processing is executed by the first application 508*a* and the second application 508*b* as each application receives user input. As noted above, "first" is used only to indicate that the application receives the first user input in a multi-touch input. Each application executes independently until a communication connection is created. Processing begins in block 602, where the system receives an input from the user. In some embodiments, this includes the system component 502 receiving input information from the input component 504 and dispatching the input information to the corresponding application 508. Processing then proceeds to block 604, where the application 508 detects an application object 516 corresponding to the user input. In general, in this step the application 508 compares the location of the touch input to the area where each application object is displayed in the user interface.

Once the application 508 has determined which application object 516 was selected by the user input, processing proceeds to decision block 606, where the system determines if the selected object supports linking to a second application. In this step, the application 508 evaluates whether the selected object provides functions that are suitable for use in a multi-touch context when communicating with a separate application. For example, the toolbox application 406 in FIG. 4 may provide interface navigation functions as well as the search functions discussed above. If the selected object is simply interface navigation, the system may determine that the selected object does not support linking. However, if the selected object is the search button 410, the system determines that the object does support linking. If the system determines in decision block 606 that the selected object does not support linking, processing proceeds to block 608, where the application 508 processes the input without attempting to handle it as part of a multi-touch input. The process then ends.

If the system determines that the selected object supports linking, processing proceeds to block 610, where the system creates a connection point for communicating with the application 508. As noted above, a connection point provides a conduit that other applications can use to transmit communications to the application 508. In some embodiments, the application 508 creates the connection point internally. Alternatively, the application 508 may request the operating system to create the connection point and may then retain a reference to the connection point as an external object. Once the connection point has been created, processing proceeds to block 612, where the application 508 registers the connection point with the link component 520. In this step, the application 508 provides the connection point and other application information to the link component 520. The application information may include the application's name (or other unique identifier) and may also include information about the object selected by the first input. Processing then proceeds to block 614, where the application 508 listens for a connection from another application.

Figure 7:
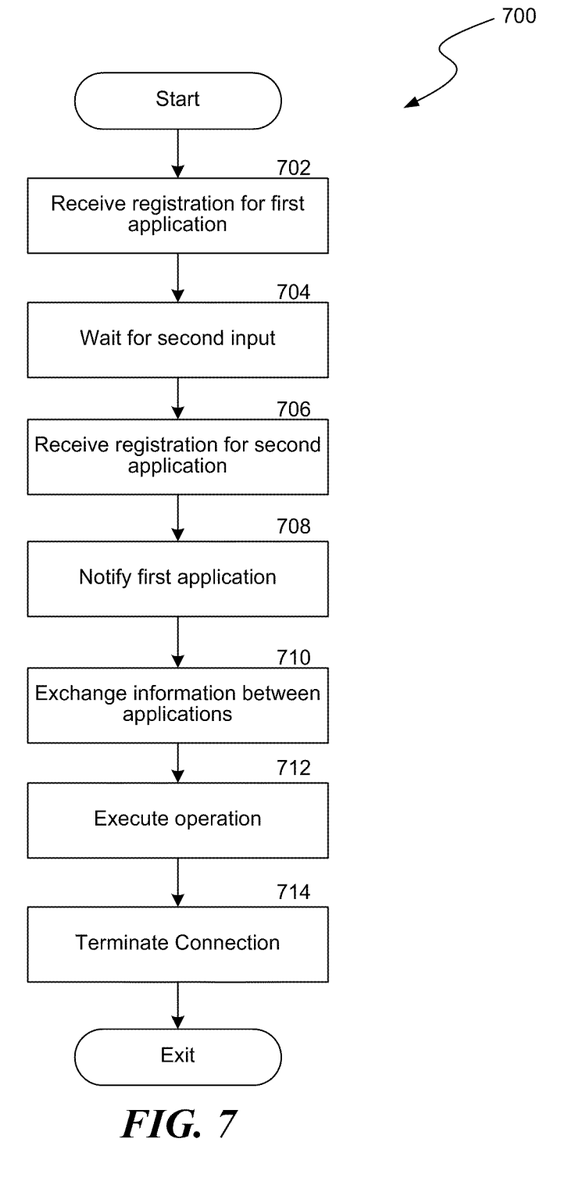
FIG. 7 is a flowchart of a process for linking two applications in response to a multi-touch input in the multi-touch input system.

FIG. 7 is a flowchart of a process 700 for linking two applications in response to a multi-touch input in the multi-touch input system. The steps of the process 700 are executed by various components of the system 500, including modules of the system component 502, the first application 508*a*, and the second application 508*b*. Processing begins at block 702, where the system component 502 receives registration information for the first application 580*a*, including a first connection point. Processing then proceeds to block 704, where the system waits to receive a second input. In general, the system creates a connection between the two applications if a second touch input is received during a time period in which the first touch input is active. In some embodiments, a touch input begins with a touch down input and ends with a touch up. The touch input is considered active during this period. If the user releases a touch without providing a second touch input, the process 700 ends without creating a communication connection. However, if the user provides a second touch input, processing proceeds to block 706, where the system component 502 receives registration information for the second application 508*b*, including a second connection point, based on the second touch input.

After the system has received registration information from the first application 508*a* and the second application 508*b*, processing proceeds to block 708, where the system notifies the first application 508*a* to complete the connection. In this step, the link component 520 provides the second application's 508*b* application information, including the second connection point, to the first application 508*a*. The first application 508*a* can then use the second connection point to communicate directly with the second application 508*b* without involving the system component 502. Although the process 700 notifies the first application after the system receives two registrations, this is not essential. In some embodiments, the system component 502 notifies the second application instead. In either case, processing proceeds to block 710, where the two applications exchange information. In this step, the first application 508*a* provides application information, including the first connection point, to the second application 508*b*, so that the second application 508*b* can communicate directly with the first application 508*a*. The information exchange is generally a handshake operation, in which the two applications exchange messages to determine whether one application or both applications should execute an operation in response to the user input. An advantage of the handshake operation is that the two applications can determine which one should execute first without regard for which application was selected first. Referring to FIG. 4, the handshake process enables the two applications to respond identically to the multi-touch input regardless of whether the user selected the toolbox application 406 or the map application 408 first. The information exchange process is discussed in greater detail below with reference to FIG. 8.

Processing then proceeds to block 712, where one or both of the applications execute an operation based on the information exchanged in block 710. In some embodiments, only one of the two applications 508 executes an operation based on the input. However, in other embodiments, both applications execute in an order determined based on the information exchange. After one or both of the applications has executed operations, processing proceeds to block 714, where the applications release the connection points and the connection is terminated. In some embodiments, the system component 502 is configured to automatically clean up and terminate the connection after each of the applications has executed and released the respective connection points. After the connection is terminated, the process 700 ends.

Figure 8:
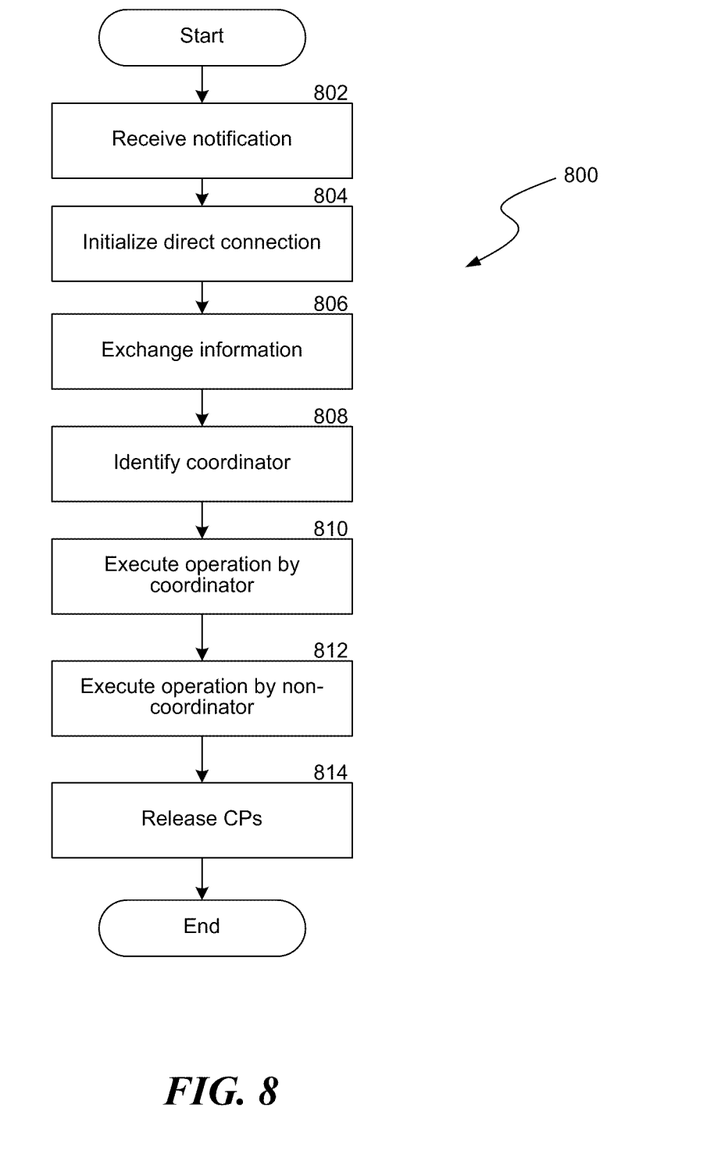
FIG. 8 is a flowchart of a process for exchanging information between the two applications and executing an operation based on the information exchange.

FIG. 8 is a flowchart of a process 800 for exchanging information between the two applications and executing an operation based on the information exchange. The process 800 provides a more detailed description of the processing of blocks 710 and 712 of FIG. 7. Processing begins at block 802, where the first application 508a receives a connection notification from the system component 502. As discussed above, the connection notification includes the second application's application information, including the second connection point. Processing then proceeds to block 804, where the applications initialize a direct connection. In particular, the first application 508a sends initialization information, including the first connection point, to the second application using the second application's connection point.

Processing then proceeds to block 806, where the two applications exchange information. As discussed above, the information exchange in block 806 includes exchanging handshake messages and other application information. Each application is configured to transmit different application information and some applications may not transmit any. For example, the toolbox application 406 might not have any application information to send to other applications, while the map application 408 might automatically send information about the selected map location (e.g., street address, latitude and longitude, etc.). The applications may exchange several types of handshaking messages, such as (1) a data request message, (2) an execute message, (3) a done message. A data request message requests additional data from the receiving application. An execute message is used to inform the receiving application that the sending application will execute an operation. A done message informs the receiving application that no further interaction will be needed. The applications will not release their connection points until each one has received a done message or an execute message from the other application. In one embodiment of the example shown in FIG. 4, the map application 408 is configured only to provide information to other applications without executing operations itself. Therefore, during the handshake process the map application 408 immediately transmits a done message to the other application. In contrast, the toolbox application 406 is generally configured to execute operations based on data received from other applications. Therefore, the toolbox application first sends a data request message to the other application to request additional data for execution. The toolbox application 406 then sends an execute message to notify the other application that it is about to execute an operation.

After the applications have exchanged information, processing proceeds to block 808, where the system identifies a coordinator, i.e., an application of the two selected applications that will execute first. In general, the coordinator is determined by the two applications based on the exchanged information, without requiring the involvement of the system component 502. Once the applications have determined a coordinator, processing proceeds to block 810, where the coordinator executes an operation. As discussed above, the operation to be executed is determined by the selected application. Processing then proceeds to block 812, where the non-coordinator application optionally executes an operation. In many cases, the non-coordinator application is configured to provide information to the coordinator but does not itself execute an operation. Therefore, block 812 is often omitted. Processing then proceeds to block 14, where the two applications terminate their processing of the multi-touch input and release their connection points.

In some embodiments, the system may include additional provision for arbitrating the priority between the two applications. This prioritization may be useful to assist the applications in determining which application should be the coordinator. For example, each application may be provided with a priority value that is either internally stored or is assigned by the system component 502. During the information exchange, each application may then provide its priority information to the other application. If both applications wish to execute an operation, the coordinator is then determined based on which application has the higher assigned priority.

Although the system is described above in the context of a mobile device, it is not so limited. One skilled in the art will appreciate that the multi-touch input system could be implemented using any computing device having a touch-sensitive input device, such as a notebook or desktop computer, a mobile Internet device, or a digital music player.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A method for handling input to a computing device including a processor, a memory, and a touch-sensitive input component, the method comprising:
receiving a first input by the touch-sensitive input component, wherein the first input is active during a first input time period, and wherein the first input time period begins when the touch-sensitive input component receives a first touch from a user and ends when the user releases the first touch;
generating a first connection point by a first application on the computing device in response to the first input;
registering the first connection point with a link component;
receiving a second input by the touch-sensitive input component, wherein the second input is active during a second input time period, and wherein the second input time period begins when the touch-sensitive input component receives a second touch from the user and ends when the user releases the second touch;
generating a second connection point by a second application on the computing device in response to the second input;
registering the second connection point with the link component;
in response to determining that the first input time period and the second input time period at least partially overlap,
exchanging application information between the first application and the second application using the first connection point and the second connection point;
based on the exchanged application information, identifying a coordinator application from one of the first application or the second application; and
executing an operation by the coordinator application.

2. The method of claim 1, further comprising determining whether the first application is linkable in response to receiving the first input, wherein the first connection point is generated in response to determining that the first application is linkable.

3. The method of claim 1, further comprising:
determining a selected object in the first application corresponding to the first input;
determining whether the selected object is linkable; and
generating the first connection point only if the selected object is determined to be linkable.

4. The method of claim 1, further comprising:
in response to registering the second application, providing a connection notification to the first application.

5. The method of claim 1, further comprising automatically unregistering the first connection point and the second connection point after the coordinator application executes the operation.

6. The method of claim 1, wherein exchanging application information comprises the first application providing initial data to initiate communications and providing additional data in response to a request from the second application.

7. A system for processing input to a computing device, the system comprising:
   a memory;
   a touch-sensitive input component capable of receiving multiple inputs during a period of time;
   a processor coupled to the memory and the touch-sensitive input component;
   a first application configured to generate a first connection point in response to a first input received through the touch-sensitive input component, wherein the first input is active during a first input time period, and wherein the first input time period begins when the touch-sensitive input component receives a first touch from a user and ends when the user releases the first touch;
   a second application configured to generate a second connection point in response to a second input received through the touch-sensitive input component, wherein the second input is active during a second input time period, and wherein the second input time period begins when the touch-sensitive input component receives a second touch from the user and ends when the user releases the second touch; and
   a link component configured to receive information from the first application registering the first connection point, to receive information from the second application registering the second connection point, and to establish a communication connection based on the received information;
   wherein in response to determining that the first input time period and the second input time period at least partially overlap, the first application and the second application are further configured to exchange information through the communication connection to identify a coordinator application and to execute an operation by the identified coordinator application.

8. The system of claim 7, wherein exchanging information comprises the first application requesting data from the second application or the second application requesting data from the first application.

9. The system of claim 7, wherein the link component is further configured to provide a proxy of the first connection point to the second application, wherein the second application communicates with the first application using the proxy of the first connection point.

10. The system of claim 7, wherein the first application is further configured to determine based on the first input whether to support a link to the second application and to generate the first connection point in response to determining that the link is supported.

11. The system of claim 7, wherein the first application is further configured to:
   determine a selected object in the first application corresponding to the first input;
   determine whether the selected object is linkable; and
   generate the first connection point only if the selected object is determined to be linkable.

12. The system of claim 7, wherein after the first connection point and the second connection point are registered, the first application and the second application communicate directly without interaction with the link component.

13. A non-transitory computer-readable medium containing instructions for handling input to a computing device including a processor, a memory, and a touch-sensitive input component, by a method comprising:
   receiving a first input and a second input by the touch-sensitive input component, wherein the first input is active during a first input time period which begins when the touch-sensitive input component receives a first touch from a user and ends when the user releases the first touch, and wherein the second input is active during a second input time period which begins when the touch-sensitive input component receives a second touch from the user and ends when the user releases the second touch;
   generating a first connection point by a first application on the computing device in response to the first input;
   registering the first connection point with a link component;
   generating a second connection point by a second application on the computing device in response to the second input;
   registering the second connection point with the link component;
   in response to determining that the first input time period and the second input time period at least partially overlap,
      exchanging information between the first application and the second application to identify a coordinator application from one of the first application or the second application; and
   executing an operation by the coordinator application.

14. A system for handling input to a computing device, comprising:
   means for receiving a first input active during a first input time period and a second input active during a second input time period, wherein the first input time period begins when the means for receiving receives a first touch from a user and ends when the user releases the first touch, and wherein the second input time period begins when the means for receiving receives a second touch from the user and ends when the user releases the second touch;
   means for generating a first connection point by a first application on the computing device in response to the first input;
   means for generating a second connection point by a second application on the computing device in response to the second input;
   means for registering the first connection point and the second connection point;
   means for exchanging application information between the first application and the second application using the first connection point and the second connection point in response to determining that the first input time period and the second input time period at least partially overlap;
   means for identifying a coordinator application from one of the first application or the second application based on the exchanged application information; and means for executing an operation by the coordinator application.

* * * * *